United States Patent

[11] 3,614,369

| [72] | Inventor | John A. Medley<br>Leeds, England |
|---|---|---|
| [21] | Appl. No. | 760,204 |
| [22] | Filed | Sept. 17, 1968 |
| [45] | Patented | Oct. 19, 1971 |
| [73] | Assignee | Wool Industries Research Association<br>Leeds, England |
| [32] | Priority | Sept. 21, 1967 |
| [33] | | Great Britain |
| [31] | | 43038/67 |

[54] METHOD OF AND APPARATUS FOR CUTTING CLOTH
8 Claims, 4 Drawing Figs.

[52] U.S. Cl. .................................................. 219/10.43,
83/18, 83/175, 83/318, 83/353, 83/428,
219/10.61, 266/23 K
[51] Int. Cl. .................................................. B26d 1/00,
B26f 3/00, B26f 3/14
[50] Field of Search ........................................ 83/18, 175,
71, 428, 177, 353, 318, 695; 266/23 A, 23 B, 23 C,
23 F, 23 K; 148/9; 226/195; 219/10.41, 10.43, 10.61

[56] References Cited
UNITED STATES PATENTS

| 3,456,540 | 7/1969 | Manini | 83/695 X |
|---|---|---|---|
| 3,486,957 | 12/1969 | Fish et al. | 83/428 X |
| 1,931,979 | 10/1933 | Chandler | 83/175 |
| 2,612,950 | 10/1952 | Ewing | 83/175 |
| 2,957,513 | 10/1960 | Schneider et al. | 266/23 X |
| 3,226,527 | 12/1965 | Harding | 83/177 X |
| 3,264,915 | 8/1966 | Peterson et al. | 83/71 |
| 3,304,820 | 2/1967 | Muller et al. | 83/428 X |
| 3,348,022 | 10/1967 | Schirmer | 83/177 X |
| 3,411,684 | 11/1968 | Tison et al. | 226/195 X |

FOREIGN PATENTS

| 993,705 | 6/1965 | Great Britain | 83/701 |
|---|---|---|---|

*Primary Examiner*—James M. Meister
*Attorney*—Breitenfeld & Levine

ABSTRACT: Cloth continuously moved under tension through a cutting zone, and cut by means having applied to it a component of motion oblique to the direction of movement of cloth. Movement of cutter may be controlled by a programmed means, e.g., a magnetic tape fed information by a computer, and feedback means for controlling position of cutter.

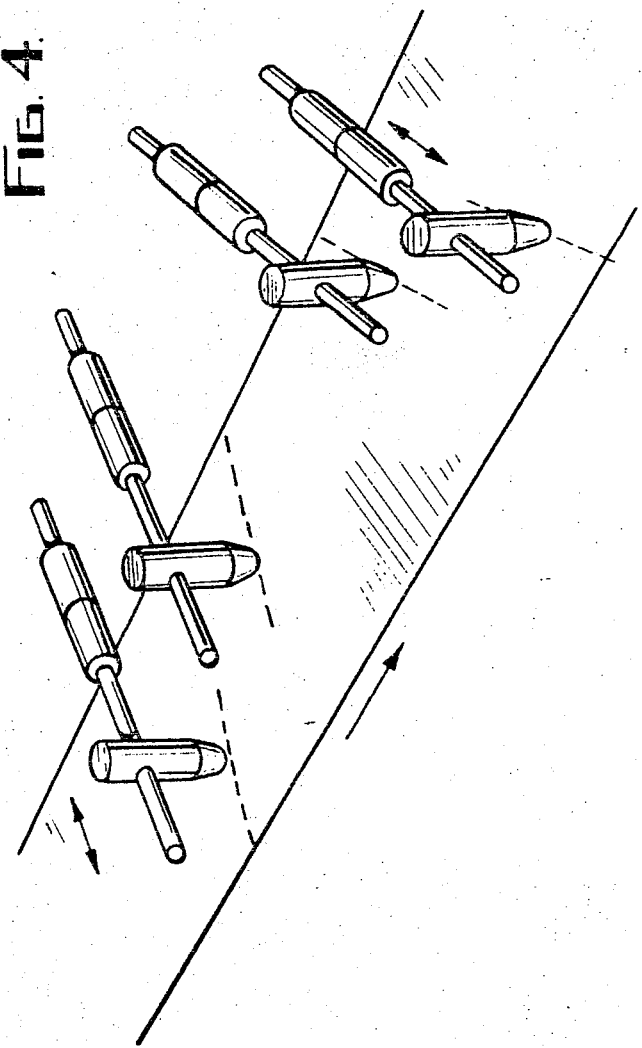

METHOD OF AND APPARATUS FOR CUTTING CLOTH

The invention relates to a method of an apparatus for cutting cloth.

Multiple clothing manufacturers who make made-to-measure clothes to individual dimensions, need to cut cloth as supplied by the cloth manufacturers into a very large variety of shapes and sizes. It is generally necessary to employ a large number of operatives for this purpose, who carry out the cutting by hand. This is time consuming and expensive and it is an object of the invention to overcome this difficulty.

According to the invention there is provided a method of cutting cloth in which the cloth is continuously moved under tension through a cutting zone and is cut by programmed cutting means in said zone.

A particularly simple and advantageous method of effecting cutting is to apply to the cutting means a component of motion in a line crossing obliquely the line of movement of the cloth. The actual movement of the cloth itself provides a second component of motion enabling a variety of shapes to be cut. The movement of the cutting means in either direction along its line of action may be controlled by a programmer to place the cutting means at any instant of time in the correct transverse position to cut a desired pattern from the moving cloth.

The method may include the step of providing a travelling belt, cushion of air or other means of support beneath the cloth in said cutting zone to prevent collapse of the cloth after cutting.

Further according to the invention there is provided apparatus for cutting cloth comprising means for continuously moving the cloth under tension through a cutting zone, and programmed cutting means movable in said cutting zone to cut the cloth in accordance with a desired program transmitted to said cutting means.

Said means for moving the cloth may be pairs of cooperating rollers spaced apart in the direction of cloth movement. Preferably, the tension of the cloth is controlled by a braking action applied to the rear rollers by a servomechanism actuated in response to signals transmitted thereto by a torque measuring device.

The cutting means may be mechanical, such as a reciprocating or rotary cutter, or nonmechanical, such as a flame of e.g. hydrogen, a light or laser beam, or an electric spark, and preferably comprises a plurality of cutting devices arranged to move back and forth across the cloth in straight lines inclined to the normal to the direction of movement of the cloth. The movement of the cutting means is preferably controlled by magnetic tape or other means to which information is fed from e.g. a computer, the cutting means being thus placed in the desired position along its line of movement at each instant in time to cut a desired pattern from the moving cloth.

An embodiment of the invention will now be described, by way of example only, with reference to the accompanying diagrammatic drawings, in which:

FIG. 4 is a view similar to FIG. 3, but showing a plurality of cutting means.

Figure 1:
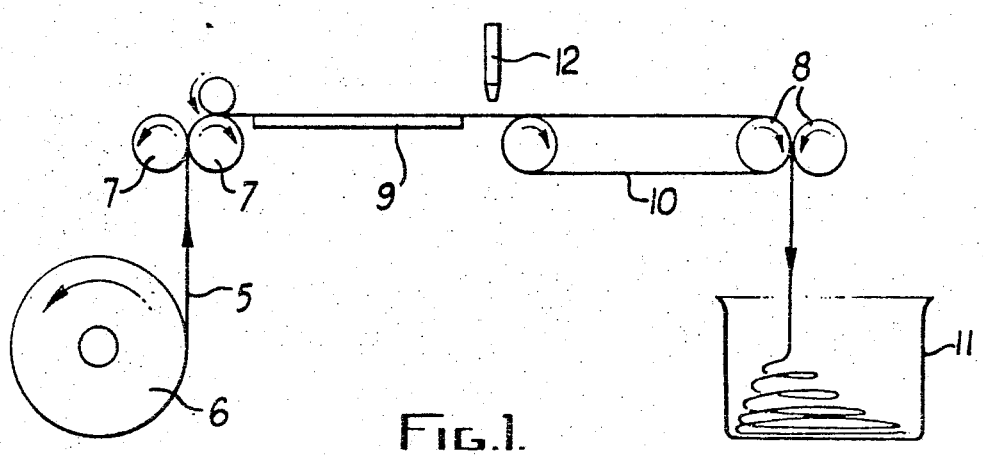
FIG. 1 is a side elevation of apparatus for carrying out the invention.

Referring to the drawings, cloth 5 to be cut is drawn from a roll 6 and continuously fed through the nips of two pairs of rollers 7 and 8, the distance between the nips being about 10 inches and the diameter of the rollers 1 inch, all the rollers being at least as long as the width of the roll of cloth. A controlled braking action is applied to the rear pair of rollers 7 thereby tensioning the cloth in the region between the two nips, which region constitutes a cutting zone. The braking action is effected by a torque measuring device driving a servomechanism. A platform 9 supports the uncut cloth leaving the rear pair of rollers 7 and an endless conveyor 10 supports the cut cloth and transports it to the forward pair of rollers 8 from whence the cut pieces drop into a suitable bin 11.

Figure 2:
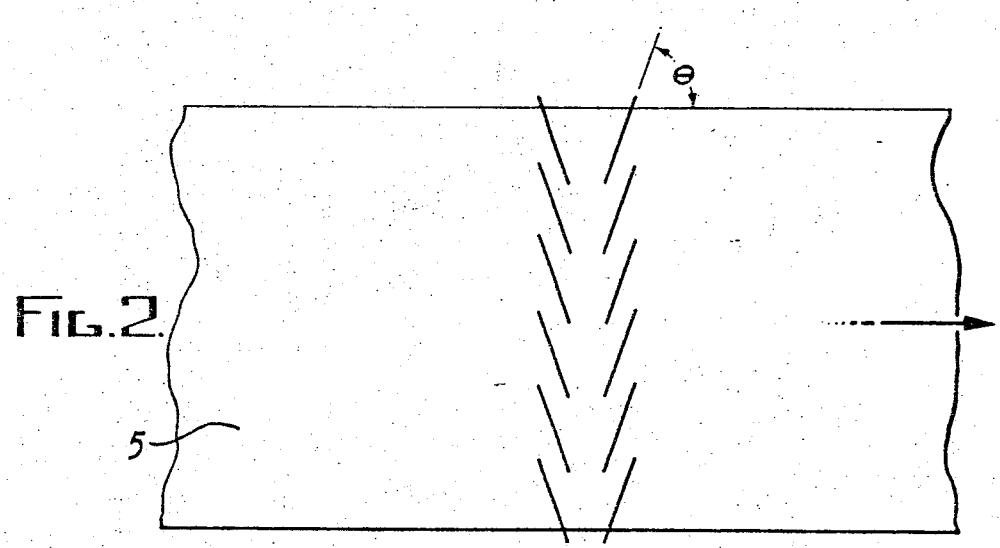
FIG. 2 is a fragmentary plan view showing the paths of cutter movement.

While any suitable cutting means may be employed, for the purposes of illustration the use of hydrogen flame cutters 12 will be described. Six pairs of such flame cutters are provided, the pairs being staggered across the cloth in the cutting zone between the pairs of rollers. The paths of movement of the cutters form a "herringbone" pattern as shown in FIG. 2. The cutters are disposed above the level of the cloth and are movable across the cloth in straight lines inclined at an angle $\theta$ between 60° and 80° to the direction of cloth movement (see FIG. 2). Due to the movement of the cloth itself many desired patterns may be cut from the cloth by operating appropriate cutters and moving them to predetermined extents along their respective lines of movement. The moving parts of the cutters are preferably of low mass to enable high-speed operation.

The requirement for plurality of cutters arises from the inability of one cutter to double back along the cloth except through an angle approximately equal to the obliquity of the path of cutter travel relative to the cloth. Moreover, a cutter moving in a straight line can not cut a line in a cloth, moving continuously in one direction, at an angle to the cloth equal to the angle that the path of the cutter makes with the direction of cloth movement. Where the cutters move in a straight line across the fabric, two cutters are, therefor, needed moving of different angles relative to the direction of cloth movement. In practice a number of separate sections of garments may be cut simultaneously from different regions across the width of the cloth so that in a typical factory installation a number of cutters would be used such as in FIG. 2 and/or the cloth would pass through several cutting zones arranged in succession.

In certain cases it may be desirable to arrange for the cutters to move in curved instead of straight paths and for complicated patterns several cutters may be necessary to cope with sudden changes in direction of cut such as sharp corners. The paths of movement of the cutters, as seen in FIG. 2, are spaced from one another in the direction of cloth movement.

Movement of the cutters is preferably effected at high speed under control of magnetic or punched tape instructions supplied, for example, from a computer. Thus, customers measurements are fed into a tape, the latter being driven synchronously with the cloth and the instructions on the tape being transmitted to the cutters to move them in the manner necessary to cut out the desired pattern. Thus the tape instructions place the cutters in the correct positions along their paths of movement at any instant of time to cut the desired pattern.

Figure 3:
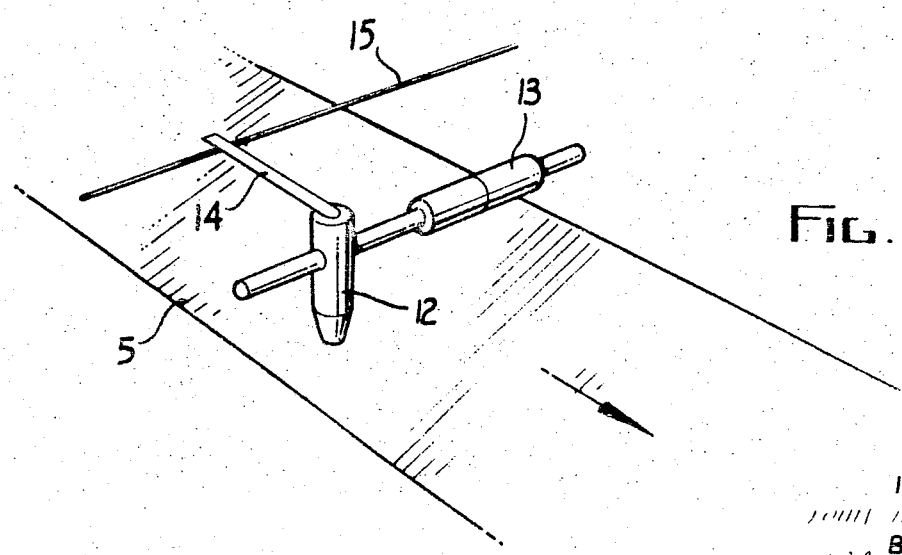
FIG. 3 is a perspective view showing cutter control arrangements.

This may be effected primarily by causing tape to control accelerating and decelerating forces imposed by pneumatic, hydraulic or electrical mechanisms on the cutter, for example hydraulic or pneumatic cylinders as shown at 13 in FIG. 3, and secondarily by modifying these forces by feedback correction. The position of the cutter at any instant of time is registered for example by an electrical contact 14 (FIG. 3) engaging with a potentiometric slidewire 15 arranged parallel to the movement of the cutter 12. This signal, in conjunction with a signal of position derived from the tape will modify and correct the imposed forces the cutter so that the cut is made at the correct position at every instant of time.

Many variations and modifications may be made without departing from the invention. For example, the cut cloth may be prevented from collapsing in the cutting zone by a cushion of compressed air applied below the cloth instead of by the conveyor 10, and the cut parts may fall in sequence on to a conveyor belt instead of into the bin 11. Other suitable means of supporting the cut cloth in the cutting zone may alternatively be provided, such as a multiple tape conveyor.

As above-mentioned, many different forms of cutting means may be sued including reciprocatory and rotary blades, and these may be made to pivot into the correct cutting attitude by castor or other pivotal mounting. Moreover, the limitations introduced in the embodiment by provision of cutters capable of only straight line movement may be removed, at the expense of complicating the cutter control arrangements, by providing, for example, a single cutter capable of movement in two directions at right angles to one another, or in any direction, thereby enabling cutting of complete patterns from continuously moving cloth utilizing a single cutter.

What is claimed is:

1. A method of cutting cloth, comprising the steps of
   a. providing at least two cutting means in a cutting zone, each cutting means being capable of traversing the full width of the cloth being cut,
   b. moving cloth to be cut through the cutting zone, said cloth movement being continuous and in only one direction,
   c. tensioning the cloth as it moves through the cutting zone, and
   d. automatically moving the cutting means, in accordance with a predetermined program, during continuous movement of the cloth, both cutting means being moved along their respective paths of movement which paths cross all lines in the cloth parallel to the the direction of cloth movement, the respective paths of movement of the cutting means at points of intersection with any one of said lines in the cloth being nonparallel to each other.

2. A method according to claim 1 wherein each of said cutting means comprises a plurality of cutters which collectively can traverse the full width of the cloth.

3. Apparatus for cutting cloth comprising means for continuously moving the cloth under tension in only one direction through a cutting zone, cutting means in said zone, said cutting means comprising a plurality of pairs of cutting devices, and means for moving said cutting means within said zone in accordance with a predetermined program to cut the cloth in s predetermined pattern, and said moving means being arranged to move said cutting devices only along paths arranged in a herringbone pattern with respect to the transverse direction of the cloth.

4. Apparatus for cutting cloth comprising means for continuously moving the cloth under tension in only one direction through a cutting zone, said cutting means comprising a pair of cutting devices, and means for moving said cutting means within said zone in accordance with a predetermined program to cut the cloth in a predetermined pattern, and said moving means being arranged to move said cutting devices only along oblique paths with respect to the direction of cloth movement, said paths being spaced apart in the direction of cloth movement.

5. Apparatus according to claim 4 including means associated with each cutting device for providing a signal representative of the location of that device along its path of movement.

6. Apparatus according to claim 5 wherein said signal-providing means includes a potentiometric wire arranged parallel to the path of movement of said cutting device, and an electrical contract carried by said cutting device and slidable along said wire.

7. Apparatus for cutting cloth comprising means for continuously moving the cloth under tension in only one direction through a cutting zone, at least two cutting means in said zone, each of said cutting means being capable of traversing the full width of the cloth being cut, and means for moving said cutting means within said zone in accordance with a predetermined program to cut the cloth in a predetermined pattern, said moving both cutting means along their respective paths of movement which paths cross all lines in the cloth parallel to the direction of cloth movement, the respective paths of movement of the cutting means at points of intersection with any one of said lines in the cloth being nonparallel to each other.

8. Apparatus according to claim 7 wherein each of said cutting means comprises a plurality of cutters which collectively can traverse the full width of the cloth.